(12) United States Patent
Ono (10) Patent No.: US 10,995,841 B2
(45) Date of Patent: May 4, 2021

(54) MEMBER JOINING STRUCTURE FOR DIFFERENTIAL DEVICE

(71) Applicant: AISIN AW CO., LTD., Anjo (JP)

(72) Inventor: Hiroyuki Ono, Anjo (JP)

(73) Assignee: AISIN AW CO., LTD., Anjo (JP)

(*) Notice: Subject to any disclaimer, the term of this patent is extended or adjusted under 35 U.S.C. 154(b) by 149 days.

(21) Appl. No.: 16/080,774

(22) PCT Filed: Mar. 29, 2017

(86) PCT No.: PCT/JP2017/012861
§ 371 (c)(1),
(2) Date: Aug. 29, 2018

(87) PCT Pub. No.: WO2017/170666
PCT Pub. Date: Oct. 5, 2017

(65) Prior Publication Data
US 2019/0056020 A1 Feb. 21, 2019

(30) Foreign Application Priority Data
Mar. 31, 2016 (JP) .............................. JP2016-070769

(51) Int. Cl.
*F16H 48/40* (2012.01)
*F16H 57/023* (2012.01)
(Continued)

(52) U.S. Cl.
CPC ........... *F16H 48/40* (2013.01); *F16H 57/023* (2013.01); *F16H 48/08* (2013.01); *F16H 2048/382* (2013.01); *F16H 2048/385* (2013.01)

(58) Field of Classification Search
CPC ................................................ F16H 2048/385
See application file for complete search history.

(56) References Cited

U.S. PATENT DOCUMENTS 8,710,393 B2* 4/2014 Okumura ............. B23K 11/093
219/78.01
8,876,649 B2* 11/2014 Uchida ................... F16H 48/38
475/220
(Continued)

FOREIGN PATENT DOCUMENTS

| JP | H03-14066 U | 2/1991 |
|---|---|---|
| JP | 2011-167746 A | 9/2011 |
| WO | 2011/089706 A1 | 7/2011 |

OTHER PUBLICATIONS

Jun. 6, 2017 International Search Report issued in International Patent Application No. PCT/JP2017/012861.

*Primary Examiner* — Ernesto A Suarez
*Assistant Examiner* — James J Taylor, II
(74) *Attorney, Agent, or Firm* — Oliff PLC (57) ABSTRACT

A member joining structure for a differential device, the member joining structure includes a ring gear including a helical tooth extending in a rotation axis direction; a differential case that is rotated with the ring gear; and a first support that is disposed in a first position at a back surface corresponding to one end of a rotation axis of the ring gear and that connects the differential case and the ring gear, and a second support that is disposed in a second position at a back surface corresponding to another end in the rotation axis direction of the ring gear and that connects the differential case and the ring gear; wherein the first support and the second support are spaced apart from each other with a cavity therebetween.

8 Claims, 3 Drawing Sheets

(51) Int. Cl.
*F16H 48/08* (2006.01)
*F16H 48/38* (2012.01)

(56) References Cited

U.S. PATENT DOCUMENTS

| | | | |
|---|---|---|---|
| 9,169,912 B2 * | 10/2015 | Sigi | F16H 48/42 |
| 9,897,188 B2 * | 2/2018 | Yanase | F16H 48/40 |
| 2012/0094798 A1 | 4/2012 | Uchida et al. | |
| 2013/0195545 A1 * | 8/2013 | Tsuchida | F16H 48/40 |
| | | | 403/270 |
| 2016/0169360 A1 * | 6/2016 | Yanase | F16H 48/40 |
| | | | 475/230 |
| 2016/0229009 A1 * | 8/2016 | Klein-Hitpass | F16H 48/00 |

* cited by examiner

MEMBER JOINING STRUCTURE FOR DIFFERENTIAL DEVICE

BACKGROUND

The present disclosure relates to a member joining structure for a differential device, and particularly relates to a joining structure between a ring gear and a differential case that is rotated with the ring gear.

Conventionally, there is known a differential device including a ring gear and a differential case that is rotated with the ring gear. This type of differential device is disclosed in, for example, International Publication No. 2011/089706 (WO 2011/089706).

WO 2011/089706 discloses a welded structure between members, namely, a differential case that is included in a differential device of an automobile and a ring gear that is joined to the differential case. In the cross-sectional structure of this welded structure, a single flange-shaped connecting portion projects from a center area along the rotation axis on the back surface of the ring gear opposite to a tooth portion thereof toward the differential case (radially inwardly). These members are welded to each other while the distal end of the connecting portion abuts the gear joining portion of the opposing differential case.

The ring gear is formed of a helical gear having a helical tooth trace that has a predetermined helical angle. Accordingly, a thrust load in the rotation axis direction of the ring gear is continuously applied to the ring gear while the ring gear meshes with an output gear that transmits torque from the engine. As a result, the ring gear is sometimes tilted in the rotation axis direction about a portion welded to the differential case as a fulcrum (the ring gear swings) due to the thrust load continuously applied to the ring gear, and thus is deformed. In conventional cases, to suppress such a deformation, the connecting portion on the back surface of the ring gear is formed to have a certain level of thickness in the rotation axis direction of the ring gear.

SUMMARY

However, in the welded structure between a differential case and a ring gear in the differential device disclosed in WO 2011/089706, it seems necessary that the connecting portion of the ring gear have an increased thickness and have a solid structure so as to suppress tilt deformation of the ring gear formed of a helical gear due to the thrust load applied to the ring gear. Accordingly, as the connecting portion has an increased thickness, the weight of the differential device including the ring gear is increased.

An exemplary aspect of the disclosure provides a member joining structure for a differential device that suppresses tilt deformation in the rotation axis direction due to a thrust load, while suppressing an increase in weight.

An exemplary aspect of the disclosure provides a member joining structure for a differential device, the member joining structure includes a ring gear including a helical tooth extending in a rotation axis direction; a differential case that is rotated with the ring gear; and a first support that is disposed in a first position at a back surface corresponding to one end of a rotation axis of the ring gear and that connects the differential case and the ring gear, and a second support that is disposed in a second position at a back surface corresponding to another end in the rotation axis direction of the ring gear and that connects the differential case and the ring gear; wherein the first support and the second support are spaced apart from each other with a cavity therebetween.

In the member joining structure for a differential device according to the one aspect of the present disclosure, as described above, the ring gear and the differential case are joined to each other, in the first position at a back surface corresponding to one end of the rotation axis of the ring gear including the helical tooth, and the second position at a back surface corresponding to the other end in the rotation axis direction of the ring gear. Accordingly, the ring gear can be joined to the differential case at two locations, namely, the first position at a back surface corresponding to the one end and the second position at a back surface corresponding to the other end of the rotation axis. Therefore, it is possible to ensure the rigidity of the member joining structure at two locations, namely, the first position and the second position where strength is required. Thus, even in the case where the area between the first position and the second position is a cavity (lightning portion), tilt deformation of the ring gear in the rotation axis direction due to the thrust load applied to the ring gear (helical gear) can be suppressed. As a result, it is possible to suppress tilt deformation of the ring gear in the rotation axis direction due to the thrust load, while suppressing an increase in weight by providing the cavity portion (lightning portion).

According to the present disclosure, as described above, it is possible to suppress tilt deformation of a ring gear in a rotation axis direction due to a thrust load, while suppressing an increase in weight.

DETAILED DESCRIPTION OF EMBODIMENTS

Hereinafter, embodiments of the present disclosure will be described with reference to the drawings.

First Embodiment

The configuration of a differential device 100 according to a first embodiment will be described with reference to FIGS. 1 and 2.

(General Configuration of the Vehicle and the Differential Device)

Figure 1:
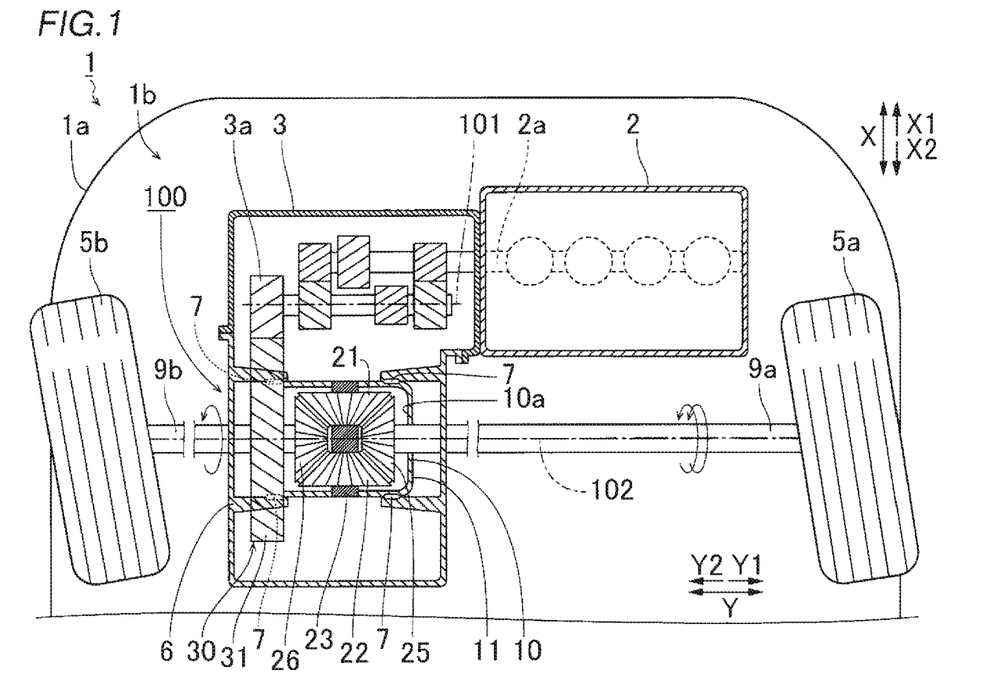
FIG. 1 schematically illustrates the configuration of a differential device mounted on a vehicle and the parts therearound according to a first embodiment of the present disclosure.

As illustrated in FIG. 1, the differential device 100 according to the first embodiment of the present disclosure has a function of transmitting a driving force (torque) of an engine (internal combustion engine) 2 mounted on a vehicle 1 to right and left drive wheels (tires) 5a and 5b. The differential device 100 is a mechanical element part provided for producing a difference in rotational speed between an inner side (for example, the drive wheel 5b) and an outer side (for example, the drive wheel 5a) of turn such that the vehicle 1 turns smoothly. In the vehicle 1, the driving force of the engine 2 (a crankshaft 2a) is transmitted from the differential device 100 to the right and left drive wheels 5a and 5b via a transmission 3.

The differential device 100 includes a differential case 10, a pair of pinion gears 21 and 22, side gears 25 and 26, and a ring gear 30. The differential case 10 includes a gear accommodating portion 10a that accommodates the four gears described above. The pinion gears 21 and 22 and the side gears 25 and 26 are accommodated in the gear accommodating portion 10a. The ring gear 30 (described below) is joined to a Y2-side peripheral portion (around an outer peripheral surface 11) of the differential case 10. Thus, the differential case 10 is configured to be rotated about a Y-axis (a rotation axis 102), together with the ring gear 30. The differential case 10 is rotatably held on a support member 6 fixed to a vehicle body 1a side via bearing members (tapered roller bearings) 7.

A pinion shaft 23 is arranged parallel to an X-axis direction and attached to the differential case 10 so as to extend through the gear accommodating portion 10a. The pinion gears 21 and 22 are rotatably attached to the pinion shaft 23 in a manner such that respective tooth portions face each other with a predetermined distance therebetween in the X-axis direction. The side gears 25 and 26 are disposed in the gear accommodating portion 10a so as to face each other with a predetermined distance therebetween in the Y-axis direction orthogonal to an arrangement direction of the pinion gears 21 and 22. Accordingly, the tooth portions of the pinion gears 21 and 22 and the side gears 25 and 26 mesh with each other. The drive wheel 5a on the Y1 side is connected to a drive shaft 9a coupled to the side gear 25 via a constant velocity joint (not illustrated), while the drive wheel 5b on the Y2 side is connected to a drive shaft 9b coupled to the side gear 26 via a constant velocity joint (not illustrated). The Y-axis direction is an example of a "rotation axis direction."

With this configuration, the driving force from the transmission 3 is transmitted to the right and left drive wheels 5a and 5b via the ring gear 30 (the differential case 10), the pinion shaft 23, the pinion gears 21 and 22, the side gears 25 and 26, and the drive shafts 9a and 9b. In the case where the vehicle 1 moves forward (not illustrated), the pinion gears 21 and 22 widely rotate about the Y-axis, together with the ring gear 30 (the differential case 10). The tooth surfaces of the pinion gears 21 and 22 push and rotate the side gears 25 and 26 at the same rotational speed, so that the drive wheels 5a and 5b are rotated at the same rotational speed. Meanwhile, in the case where the vehicle 1 turns left, for example (see FIG. 1), the pinion gears 21 and 22 rotate about the Y-axis while individually revolving about the pinion shaft 23, so that the side gear 25 on the outer wheel side (the Y1 side) is rotated faster than the side gear 26 on the inner wheel side (the Y2 side). Accordingly, the drive wheel 5a is rotated faster than the drive wheel 5b, so that the vehicle 1 turns to the left smoothly (without resistance).

In the vehicle 1, the engine 2 is transversely mounted such that the crankshaft 2a (indicated by dashed lines) extends in the Y-axis direction. The transmission 3 employs a multiple-speed transmission mechanism that changes the reduction ratio in a stepwise manner, and has a rotation axis 101 (indicated by a one-dot chain line) parallel to the Y-axis direction. Accordingly, an output gear (helical gear) 3a of the transmission 3 and the ring gear 30 of the differential device 100 mesh with each other while the rotation axis 101 of the output gear 3a and the rotation axis 102 of the ring gear 30 are arranged parallel to each other. The output gear 3a is a cylindrical gear formed of a helical gear having a helical tooth trace that has a predetermined helical angle with respect to the rotation axis 101. Note that the vehicle 1 is a front-wheel-drive (FF) automobile in which the engine 2 and the transmission 3 are mounted in an engine room 1b at the front and the front wheels (the drive wheels 5a and 5b) are driven.

(Internal Structure of the Differential Device)

Figure 2:
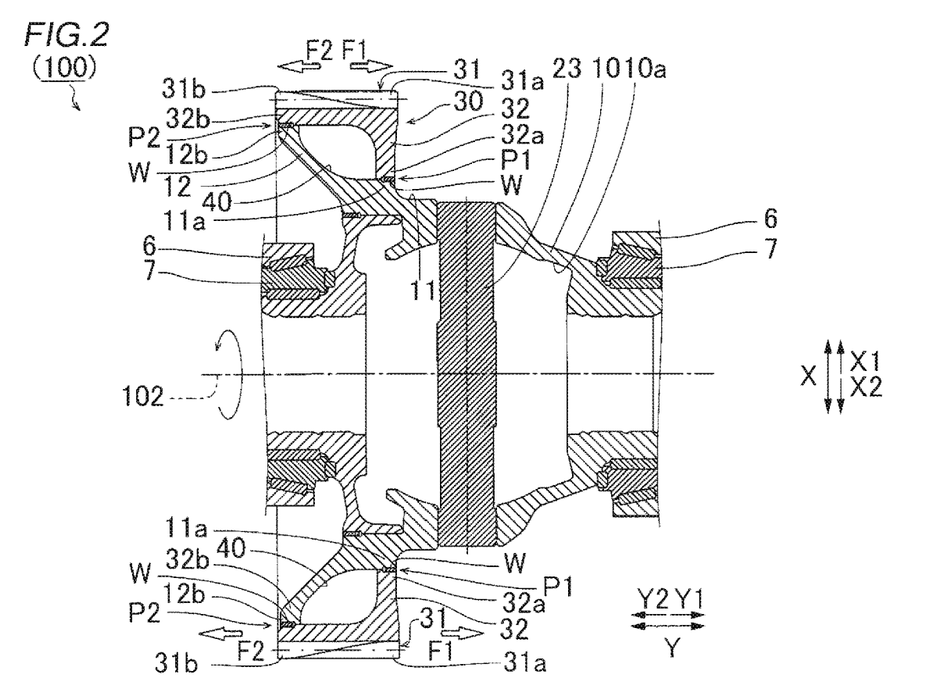
FIG. 2 is a cross-sectional view illustrating a joining structure between a differential case and a ring gear included in the differential device according to the first embodiment of the present disclosure.

As illustrated in FIG. 2, the ring gear 30 is a helical gear that can mesh with the output gear 3a. That is, the ring gear 30 includes a helical tooth portion 31 (i.e., helical tooth) extending in the rotation axis direction (the Y-axis direction) and having a helical tooth trace that has a predetermined helical angle with respect to the rotation axis 102 (indicated by a one-dot chain line). The ring gear 30 is formed circumferentially around the rotation axis 102. In the differential device 100, a thrust load F1 or F2 in the rotation axis direction of the ring gear 30 is continuously applied to the ring gear 30 while the ring gear 30 meshes with the output gear (helical gear) 3a of the transmission 3. In this case, one of the thrust load F1 and the thrust load F2 is generated in the ring gear 30 in accordance with the traveling direction (the rotational direction of the ring gear 30) of the vehicle 1.

The ring gear 30 includes a support portion 32 extending radially inwardly on the back surface side of the helical tooth portion 31. The support portion 32 is formed integrally with the ring gear 30, and is formed circumferentially (in a flange shape) around the rotation axis 102 on the back surface side (the radially inner side) of the helical tooth portion 31. Accordingly, the ring gear 30 has an L-shape in a cross section along the rotation axis 102 (a cross section in the direction perpendicular to the paper surface of FIG. 2). Further, the ring gear 30 includes a support end 32a disposed at a back surface portion (i.e., back surface) corresponding to one end 31a (on the Y1 side) of the rotation axis 102, and a joining end 32b disposed at a back surface portion corresponding to another end 31b (on the Y2 side) of the rotation axis 102. The support end 32a and the joining end 32b are formed circumferentially around the rotation axis 102. Note that FIG. 2 illustrates only the joining structure between the differential case 10 and the ring gear 30, and does not illustrate the pinion gears 21 and 22 or the side gears 25 and 26 (see FIG. 1). The support portion 32 and the support end 32a are examples of a "first connecting portion/first support" and a "first end", respectively.

The differential case 10 includes a support portion 12 extending radially outwardly from the outer peripheral surface 11. The support portion 12 is formed integrally with the differential case 10, and is formed circumferentially (in a flange shape) around the rotation axis 102 on the outer peripheral surface 11. A support end 12b is provided at the distal end of the support portion 12, and a gear joining portion 11a is provided on the outer peripheral surface 11 at the base portion of the support portion 12. The support portion 12 and the support end 12b are examples of a "second connecting portion/second support" and a "second end", respectively.

In the first embodiment, the ring gear 30 and the differential case 10 are welded (joined) to each other, in a joining position P1 at a back surface portion corresponding to the one end 31a of the rotation axis 102 of the ring gear 30 including the helical tooth portion 31, and a joining position P2 at a back surface portion corresponding to the other end 31b in the rotation axis direction (the Y-axis direction) of the ring gear 30. That is, the support end 32a of the support portion 32 on the differential case 10 side and the gear joining portion 11a on the outer peripheral surface 11 of the differential case 10 facing the support end 32a are welded to each other. Meanwhile, the support end 12b of the support portion 12 on the ring gear 30 side and the joining end 32b on the back surface side of the other end 31b of the ring gear 30 facing the support end 12b are welded to each other. Thus, the support portion 32 and the support portion 12 are spaced apart from each other with a cavity 40 therebetween. The joining positions P1 and P2 are examples of a "first position" and a "second position", respectively.

The joining positions P1 and P2 are respectively located in the same positions as (in the positions overlapping) the one end 31a (the Y1 side) and the other end 31b (the Y2 side) of the rotation axis 102 of the ring gear 30, as viewed from the radial direction of the ring gear 30 (the X-axis direction). Further, each of the joining positions P1 and P2 extends circumferentially around the rotation axis 102 of the ring gear 30. That is, weld areas (weld beads) between the ring gear 30 and the differential case 10 at two locations (the joining positions P1 and P2) are formed circumferentially (in an arcuate shape) around the rotation axis 102. Accordingly, the cavity 40 extends circumferentially around the rotation axis 102. Further, the weld areas W between the ring gear 30 and the differential case 10 at two locations (the joining positions P1 and P2) extend in the rotation axis direction (the Y-axis direction) of the ring gear 30. In this case, the weld areas W extend a predetermined distance on the support end 32a and the gear joining portion 11a (the joining end 32b and the support end 12b) facing each other along the direction parallel to the rotation axis 102.

Further, in the first embodiment, the joining position P1 between the support end 32a and the differential case 10 and the joining position P2 between the support end 12b and the ring gear 30 are different from each other in the radial direction of the ring gear 30. That is, the joining position P1 is located near the rotation axis 102 in the radial direction, and the joining position P2 is located on an outer side in the radial direction with respect to the joining position P1.

In the differential device 100, although the thrust load F1 or F2 is applied to the ring gear 30 while the ring gear 30 meshes with the output gear 3a of the transmission 3, the ring gear 30 and the differential case 10 are welded to each other at two locations, namely, the joining position P1 corresponding to the one end 31a and the joining position P2 corresponding to the other end 31b of the ring gear 30. Accordingly, although the cavity 40 is provided in the area between the support portion 32 and the support portion 12 that is not effectively used, it is possible to ensure the rigidity of the member joining structure at two locations, namely, the joining positions P1 and P2 where strength is required, so that tilt deformation of the ring gear 30 in the rotation axis direction due to the thrust load F1 or F2 is suppressed. In this manner, the member joining structure for the differential device 100 of the first embodiment is configured.

Effects of the First Embodiment

According to the first embodiment, the following effects can be obtained.

In the first embodiment, as described above, the ring gear 30 and the differential case 10 are joined to each other, in the joining position P1 at a back surface portion corresponding to the one end 31a of the rotation axis 102 of the ring gear 30 including the helical tooth portion 31, and the joining position P2 at a back surface portion corresponding to the other end 31b in the rotation axis direction (the Y-axis direction) of the ring gear 30. Accordingly, the ring gear 30 can be joined to the differential case 10 at two locations, namely, the joining position P1 at a back surface portion corresponding to the one end 31a and the joining position P2 at a back surface portion corresponding to the other end 31b of the rotation axis 102. Therefore, it is possible to ensure the rigidity of the member joining structure at two locations, namely, the joining positions P1 and P2 where strength is required. Thus, even in the case where the area between the joining position P1 and the joining position P2 is the cavity 40 (lightning portion), tilt deformation of the ring gear 30 in the rotation axis direction due to the thrust load F1 or F2 applied to the ring gear 30 formed of a helical gear can be suppressed. As a result, it is possible to obtain the differential device 100 capable of suppressing tilt deformation of the ring gear 30 in the rotation axis direction due to the thrust load F1 or F2, while suppressing an increase in weight by providing the cavity 40 (a lightning portion) (while achieving a reduction in weight).

Further, in the first embodiment, both the joining positions P1 and P2 extend circumferentially around the rotation axis 102 of the ring gear 30. Accordingly, the ring gear 30 can be circumferentially joined to the differential case 10 at the joining position P1 and the joining position P2 that are arranged circumferentially, so that tilt deformation of the rotating ring gear 30 in the rotation axis direction can be more effectively suppressed. In this case, the cavity 40 (a lightning portion) between the joining position P1 and the joining position P2 can be formed circumferentially, so that it is possible to maintain an appropriate weight balance around the rotation axis 102 of the rotating ring gear 30. As a result, it is possible to reduce the weight of the differential device 100 and suppress the occurrence of vibrations and the like due to an unbalanced weight.

Further, in the first embodiment, the differential device 100 is formed by welding the ring gear 30 and the differential case 10 to each other in the joining positions P1 and P2. Accordingly, for example, unlike the case where the ring gear 30 and the differential case 10 are fastened with a plurality of bolt members, the weight of the differential device 100 can be reliably reduced because a plurality of bolt members are not used.

Further, in the first embodiment, the joining positions P1 and P2 are respectively disposed in the same positions as (in the positions overlapping) the one end 31a and the other end 31b of the rotation axis 102 of the ring gear 30, as viewed from the radial direction of the ring gear 30. Accordingly, the differential case 10 and the ring gear 30 do not have to have such cross-sectional shape that the joining positions are located on the outer side of the ring gear 30 in the width direction along the Y-axis direction, so that it is possible to reduce the weight of the differential device 100 without adversely affecting the mountability of the differential device 100 to the vehicle body 1a.

Further, in the first embodiment, the ring gear 30 is provided with the support portion 32 that is located in the joining position P1 and that connects the differential case 10 and the ring gear 30, while the differential case 10 is provided with the support portion 12 that is located in the joining position P2 and that connects the differential case 10 and the ring gear 30. The support portion 32 and the support portion 12 are spaced apart from each other with the cavity 40 therebetween. Accordingly, the differential case 10 and the ring gear 30 can be joined to each other with the support portion 32 in the joining position P1 and the support portion 12 in the joining position P2 interposed therebetween. Moreover, since the cavity 40 is provided between the support portion 32 and the support portion 12, it is possible to reliably suppress an increase in weight of the differential device 100.

Further, in the first embodiment, the support portion 32 is formed integrally with the ring gear 30, and the support portion 12 is formed integrally with the differential case 10. The support end 32a of the support portion 32 on the differential case 10 side and the gear joining portion 11a of the differential case 10 facing the support end 32a are joined to each other, while the support end 12b of the support portion 12 on the ring gear 30 side and the joining end 32b on the back surface side of the ring gear 30 facing the support end 12b are joined to each other. Accordingly, it is possible to join only two members, namely, the ring gear 30 including the support portion 32 and the differential case 10 including the support portion 12 to each other such that the two members face each other in the radial direction of the ring gear 30. Therefore, the joining structure is simplified, making it possible to suppress an increase in the number of components of the differential device 100.

Further, in the first embodiment, the joining position P1 between the support end 32a and the differential case 10 and the joining position P2 between the support end 12b and the ring gear 30 are different in the radial direction of the ring gear 30. Accordingly, the differential case 10 and the ring gear 30 have an asymmetric cross-sectional shape along the rotation axis 102 (the Y-axis direction), which allows the assembly operator to join (weld) the ring gear 30 without an error in the joining direction (the welding direction) with respect to the differential case 10.

Further, in the first embodiment, the ring gear 30 including the support portion 32 is formed to have an L shape in a cross section along the rotation axis 102. Accordingly, the joining position P1 (the support end 32a) at a back surface portion corresponding to the one end 31a of the ring gear 30 is suppressed from projecting outwardly (the arrow Y1 direction) with respect to the one end 31a, so that it is possible to suppress an increase in size of the ring gear 30.

Further, in the first embodiment, the weld areas W between the ring gear 30 and the differential case 10 extend in the rotation axis direction (the Y-axis direction) of the ring gear 30. Accordingly, the weld areas W extend a predetermined distance on the support end 32a and the gear joining portion 11a (the joining end 32b and the support end 12b) facing each other along the direction parallel to the rotation axis 102. Moreover, the weld areas W can be disposed around the rotation axis 102. Thus, it is possible to reliably secure the joining strength between the ring gear 30 and the differential case 10 in the joining positions P1 and P2.

Modification of the First Embodiment

Next, a modification of the first embodiment will be described with reference to FIGS. 1 and 3. In the modification of the first embodiment, an example will be described in which a joining structure in a differential device 150 is formed using a ring gear 130 and a differential case 110 having shapes different from those of the first embodiment. In the drawings, the same elements as those of the first embodiment are denoted by the same reference numerals.

Figure 3:
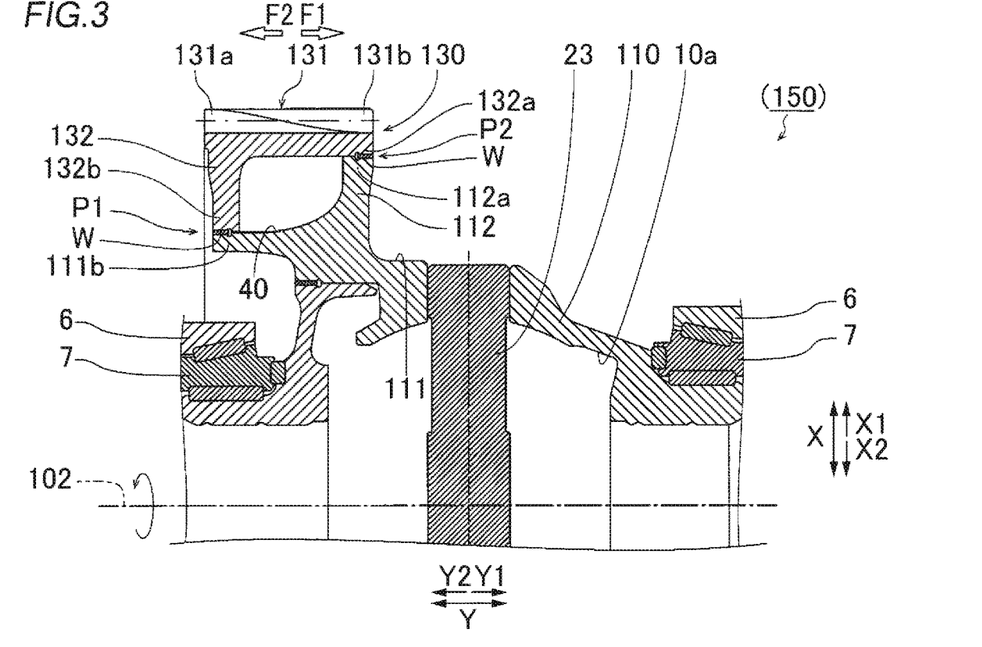
FIG. 3 is a partial cross-sectional view illustrating a joining structure between a differential case and a ring gear included in a differential device according to a modification of the first embodiment of the present disclosure.

In the differential device 150 according to the modification of the first embodiment, as illustrated in FIG. 3, the ring gear 130 is welded to an outer peripheral surface 111 of the differential case 110.

The ring gear 130 integrally includes a support portion 132 extending radially inwardly on the back surface side of a helical tooth portion 131. The support portion 132 extends radially inwardly from a back surface portion corresponding to one end 131a (on the Y2 side) of a rotation axis 102 of the ring gear 130, and the ring gear 130 has an L-shape in a cross section as viewed along the rotational direction. Further, the ring gear 130 includes a joining end 132a disposed at a back surface portion corresponding to another end 131b (on the Y1 side) of the rotation axis 102, and a support end 132b disposed at a back surface portion corresponding to the one end 131a of the rotation axis 102. Note that FIG. 3 illustrates only the joining structure between the differential case 110 and the ring gear 130, and does not illustrate the pinion gears 21 and 22 or the side gears 25 and 26 (see FIG. 1). The support portion 132 and the support end 132b are examples of a "first connecting portion/first support" and a "first end", respectively.

The differential case 110 includes a support portion 112 extending radially outwardly from the outer peripheral surface 111. A support end 112a is provided at the distal end of the support portion 112, and a gear joining portion 111b is provided on the outer peripheral surface 111 at the base portion of the support portion 112. The support portion 112 and the support end 112a are examples of a "second connecting portion/second support" and a "second end", respectively.

With this configuration, in the modification of the first embodiment, the ring gear 130 and the differential case 110 are welded (joined) to each other, in a joining position P1 at a back surface portion corresponding to the one end 131a (on the Y2 side) of the rotation axis 102 of the ring gear 130 including the helical tooth portion 131, and a joining position P2 at a back surface portion corresponding to the other end 131b (on the Y1 side) in the rotation axis direction (the Y-axis direction) of the ring gear 130. That is, the support end 132b of the support portion 132 on the differential case 110 side and the gear joining portion 111b on the outer peripheral surface 111 of the differential case 110 facing the support end 132b are welded to each other. Meanwhile, the support end 112a of the support portion 112 on the ring gear 130 side and the joining end 132a on the back surface side of the other end 131b of the ring gear 130 facing the support end 112a are welded to each other. The support portion 132 and the support portion 112 are spaced apart from each other with a circumferential cavity 40 therebetween. The other features of the differential device 150 are the same as those of the first embodiment.

Effects of the Modification of the First Embodiment

In the modification of the first embodiment, the support portion 132 is formed integrally with the ring gear 130, and the support portion 112 is formed integrally with the differential case 110. The support end 132b of the support portion 132 on the differential case 110 side and the gear joining portion 111b on the outer peripheral surface 111 of the differential case 110 facing the support end 132b are welded to each other, while the support end 112a of the support portion 112 on the ring gear 130 side and the joining end 132a on the back surface side of the ring gear 130 facing the support end 112a are welded to each other. Accordingly, it is possible to join only two members, namely, the ring gear 130 including the support portion 132 and the differential case 110 including the support portion 112 to each other such that the two members face each other in the radial direction of the ring gear 130. Therefore, the joining structure is simplified, making it possible to suppress an increase in the number of components of the differential device 150. The other effects are the same as those of the first embodiment.

Second Embodiment

Next, a second embodiment will be described with reference to FIGS. 1 and 4. In the second embodiment, an example will be described in which a joining structure in a differential device 200 is formed using a ring gear 230 and a differential case 210 having shapes different from those of the first embodiment. In the drawings, the same elements as those of the first embodiment are denoted by the same reference numerals.

Figure 4:
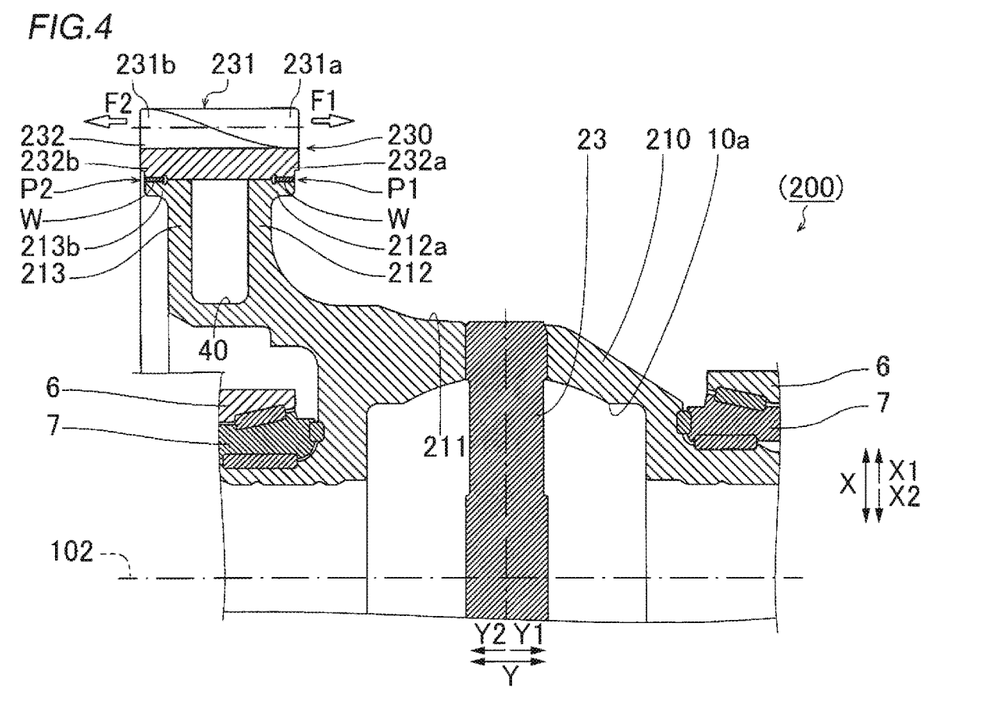
FIG. 4 is a partial cross-sectional view illustrating a joining structure between a differential case and a ring gear included in a differential device according to a second embodiment of the present disclosure.

In the differential device 200 according to the second embodiment, as illustrated in FIG. 4, the ring gear 230 is welded to the differential case 210.

The ring gear 230 includes only a gear portion 232 including a helical tooth portion 231. Note that the ring gear 230 includes a joining end 232a disposed at a back surface portion corresponding to one end 231a (on the Y1 side), and a joining end 232b disposed at a back surface portion corresponding to another end 231b (on the Y2 side). The joining ends 232a and 232b are disposed circumferentially at a back surface portion of the gear portion 232, with a predetermined distance therebetween in the Y-axis direction.

Meanwhile, the differential case 210 includes a pair of support portions 212 and 213 extending radially outwardly from an outer peripheral surface 211. A support end 212a is provided at the distal end of the support portion 212, and a support end 213b is provided at the distal end of the support portion 213. Note that FIG. 4 illustrates only the joining structure between the differential case 210 and the ring gear 230, and does not illustrate the pinion gears 21 and 22 or the side gears 25 and 26 (see FIG. 1). The support portions 212 and 213 are examples of a "first connecting portion/first support" and a "second connecting portion/second support", respectively. The support end 212a and the support end 213b are examples of a "first end" and a "second end", respectively.

With this configuration, in the second embodiment, the ring gear 230 and the differential case 210 are welded (joined) to each other, in a joining position P1 at a back surface portion corresponding to the one end 231a of the rotation axis 102 of the ring gear 230 including the helical tooth portion 231, and a joining position P2 at a back surface portion corresponding to the other end 231b in the rotation axis direction (the Y-axis direction) of the ring gear 230. That is, the support ends 212a and 213b of the support portions 212 and 213 on the side opposite to the differential case 210 and the joining ends 232a and 232b at the gear portion 232 of the ring gear 230 facing the support ends 212a and 213b are welded to each other. The support portion 212 and the support portion 213 are spaced apart from each other with a circumferential cavity 40 therebetween. The other features of the differential device 200 are the same as those of the first embodiment.

Effects of the Second Embodiment

In the second embodiment, as described above, the support portions 212 and 213 are formed integrally with the differential case 210, and the support ends 212a and 213b of the support portions 212 and 213 on the side opposite to the differential case 210 and the joining ends 232a and 232b at the gear portion 232 of the ring gear 230 facing the support ends 212a and 213b are welded to each other. Accordingly, it is possible to form a simple joining structure with only two members, namely, the differential case 210 integrally including the support portions 212 and 213 and the ring gear 230, and thus to suppress an increase in the number of components of the differential device 200. The other effects are the same as those of the first embodiment.

Modification of the Second Embodiment

Next, a modification of the second embodiment will be described with reference to FIGS. 1 and 5. In the modification of the second embodiment, an example will be described in which a joining structure in a differential device 250 is formed using a ring gear 235 and a differential case 215 having shapes different from those of the second embodiment. In the drawings, the same elements as those of the first embodiment are denoted by the same reference numerals.

Figure 5:
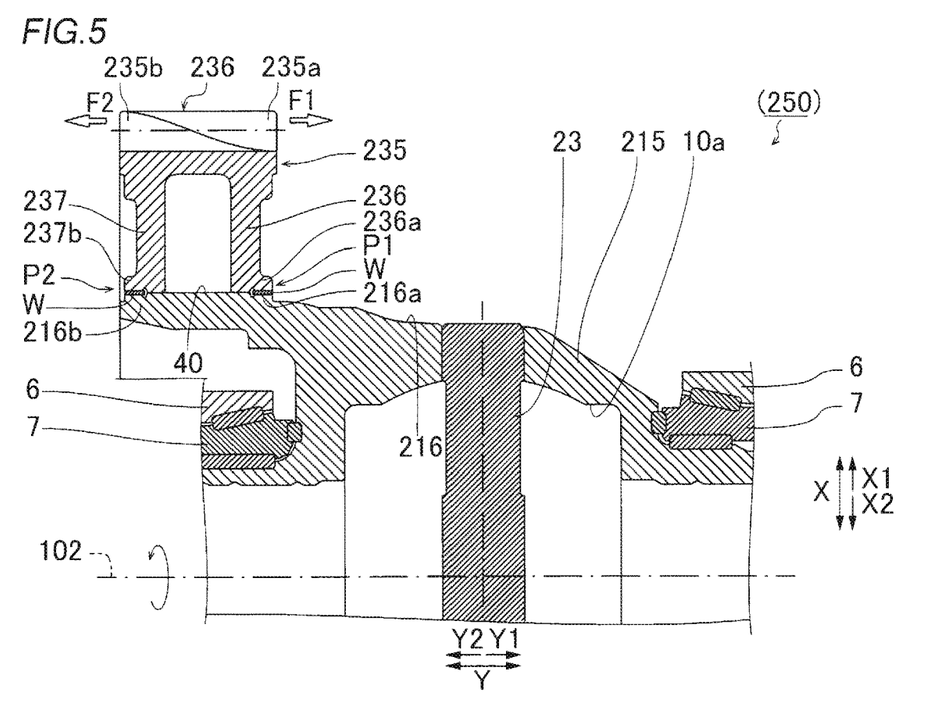
FIG. 5 is a partial cross-sectional view illustrating a joining structure between a differential case and a ring gear included in a differential device according to a modification of the second embodiment of the present disclosure.

In the differential device 250 according to the modification of the second embodiment, as illustrated in FIG. 5, the ring gear 235 is welded to the differential case 215.

The ring gear 235 integrally includes a support portion 236 and a support portion 237 extending radially inwardly on the back surface side of the helical tooth portion 234. A support end 236a is provided at the distal end of the support portion 236, and a support end 237b is provided at the distal end of the support portion 237. Note that FIG. 5 illustrates only the joining structure between the differential case 215 and the ring gear 235, and does not illustrate the pinion gears 21 and 22 or the side gears 25 and 26 (see FIG. 1). The support portions 236 and 237 are examples of a "first connecting portion/first support" and a "second connecting portion/second support", respectively. The support ends 236a and 237b are examples of a "first end" and a "second end", respectively.

Meanwhile, the differential case 215 includes only an outer peripheral surface 216. Note that gear joining portions 216a and 216b are disposed on the outer peripheral surface 216, with a predetermined distance therebetween in the Y-axis direction. The gear joining portions 216a and 216b are disposed circumferentially on the outer peripheral surface 216, with a predetermined distance therebetween in the Y-axis direction.

With this configuration, in the modification of the second embodiment, the ring gear 235 and the differential case 215 are welded (joined) to each other, in a joining position P1 at a back surface portion corresponding to one end 235a (on the Y1 side) of the rotation axis 102 of the ring gear 235 including the helical tooth portion 236, and a joining position P2 at a back surface portion corresponding to another end 235b (on the Y2 side) in the rotation axis direction (the Y-axis direction) of the ring gear 235. That is, the support ends 236a and 237b of the support portions 236 and 237 on the side opposite to the ring gear 235 and the gear joining portions 216a and 216b on the outer peripheral surface 216 of the differential case 215 facing the support ends 236a and 237b are welded to each other. The support portion 236 and the support portion 237 are spaced apart from each other with a circumferential cavity 40 therebetween. The other features of the differential device 250 are the same as those of the first embodiment.

Effects of the Modification of the Second Embodiment

In the modification of the second embodiment, the support portions 236 and 237 are formed integrally using the ring gear 235, and the support ends 236a and 237b of the support portions 236 and 237 on the side opposite to the ring gear 235 and the gear joining portions 216a and 216b on the outer peripheral surface 216 of the differential case 215 facing the support ends 236a and 237b are welded to each other. Accordingly, it is possible to form a simple joining structure with only two members, namely, the ring gear 235 integrally including the support portions 236 and 237 and the differential case 215, and thus to suppress an increase in the number of components of the differential device 250. The other effects are the same as those of the first embodiment.

Third Embodiment

Next, a third embodiment will be described with reference to FIGS. 1 and 6. In the third embodiment, an example will be described in which a ring gear 230 and a differential case 215 are joined to each other by interposing connecting members that are provided separately. In the drawings, the same elements as those of the first embodiment are denoted by the same reference numerals.

Figure 6:
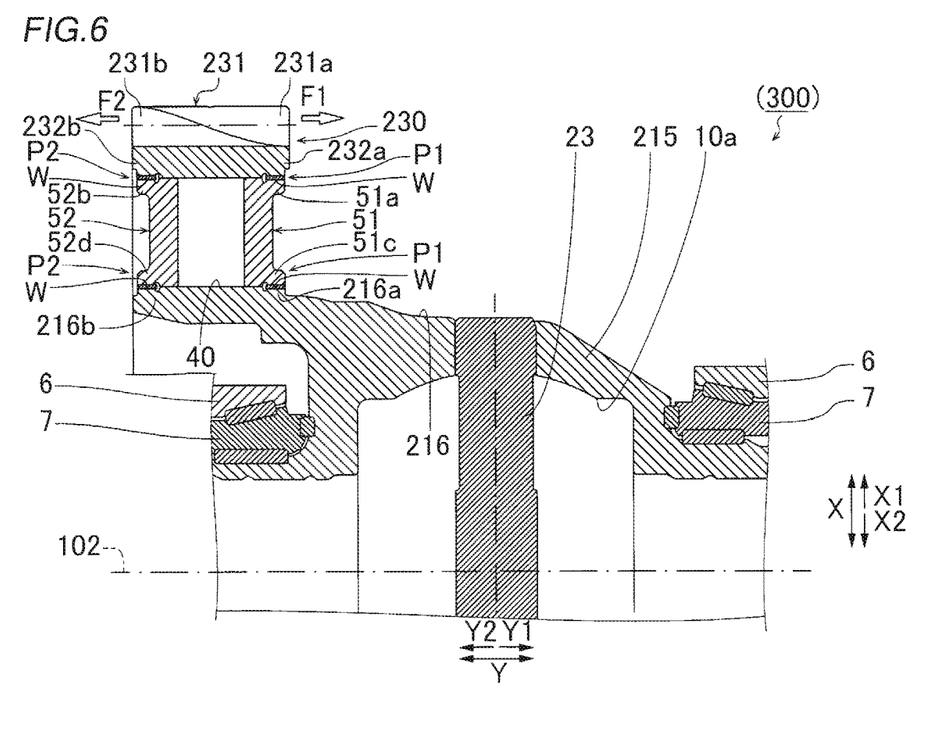
FIG. 6 is a partial cross-sectional view illustrating a joining structure between a differential case and a ring gear included in a differential device according to a third embodiment of the present disclosure.

In a differential device 300 according to the third embodiment, as illustrated in FIG. 6, the ring gear 230 is joined to the differential case 215.

The ring gear 230 includes only a gear portion 232 including a helical tooth portion 231. That is, the ring gear 230 includes a joining end 232a disposed at a back surface portion corresponding to one end 231a, and a joining end 232b disposed at a back surface portion corresponding to another end 231b. The differential case 215 includes only an outer peripheral surface 216. That is, gear joining portions 216a and 216b are disposed on the outer peripheral surface 216, with a predetermined distance therebetween in the Y-axis direction. Note that FIG. 6 illustrates only the joining structure between the differential case 215 and the ring gear 230, and does not illustrate the pinion gears 21 and 22 or the side gears 25 and 26 (see FIG. 1).

In the third embodiment, the differential case 215 and the ring gear 230 are joined to each other via support members 51 and 52. That is, the joining end 232a and an outer end 51a of the support member 51 are welded (joined) in a joining position P1 at a back surface portion corresponding to the one end 231a of the rotation axis 102 of the ring gear 230 including the helical tooth portion 231, while the joining end 232b and an outer end 52b of the support member 52 are welded (joined) in a joining position P2 at a back surface portion corresponding to the other end 231b of the rotation axis 102 of the ring gear 230. An inner end 51c of the support member 51 and the gear joining portion 216a on the outer peripheral surface 216 of the differential case 215 are welded (joined) in the joining position P1, while an inner end 52d of the support member 52 and the gear joining portion 216b on the outer peripheral surface 216 of the differential case 215 are welded (joined) in the joining position P2. The support members 51 and 52 are substantially the same members and have substantially the same shape. Each of the support members 51 and 52 is formed in an annular shape. The support members 51 and 52 are examples of a "first connecting portion/first support" and a "second connecting portion/second support", respectively. The outer end 51a and the inner end 51c are examples of "opposite ends" and the outer end 52b and the inner end 52d are examples of "opposite ends."

Accordingly, in the welded structure between the differential case 215 and the ring gear 230 in the differential device 300, these members are connected to each other via the support members 51 and 52 at two locations on the radially inner side and outer side in the joining position P1, and at two locations on the radially inner side and outer side in the joining position P2, that is, total of four weld areas W. The four weld areas W are circumferentially formed. The other features of the differential device 300 are the same as those of the first embodiment.

Effects of the Third Embodiment

In the third embodiment, as described above, the support members 51 and 52 are provided separately from the ring gear 230 and the differential case 215. The ring gear 230 and the differential case 215 are joined to each other via the outer end 51a and the inner end 51c of the support member 51, and are joined to each other via the outer end 52b and the inner end 52d of the support member 52. Accordingly, unlike the differential devices 100 (150, 200, 250) of the first and second embodiments described above, although the general-purpose ring gear 230 and differential case 215 not having a radially extending projection such as a support portion are used, it is possible to form the differential device 300 using the support members 51 and 52 that are spaced apart from each other with the cavity 40 therebetween. According to the differential device 300, it is possible to suppress tilt deformation of the ring gear 230 in the rotation axis direction due to the thrust load F1 or F2, while suppressing an increase in weight. The other effects are the same as those of the first embodiment.

[Modifications]

The presently disclosed embodiments should be considered in all respects to be illustrative and not restrictive.

For example, in the first to third embodiments, the joining positions P1 and P2 are respectively located in the same positions as (in the positions overlapping) the one end 31a (131a, 231a, 235a) and the other end 31b (131b, 231b, 235b) of the ring gear 30 (130, 230, 235), as viewed from the radial direction. However, the present disclosure is not limited thereto. For example, the joining positions P1 and P2 may be located in positions that are shifted slightly inward from the one end 31a and the other end 31b of the ring gear 30 along the rotation axis 102.

Further, in the first to third embodiments, the weld areas (weld beads) W between the ring gear 30 (130, 230, 235) and the differential case 10 (110, 210, 215) extend in the rotation axis direction (the Y-axis direction) of the ring gear 30. However, the present disclosure is not limited thereto. For example, the ring gear 30 and the differential case 10 may be welded in the joining positions P1 and P2 such that the weld areas (weld beads) W extend in the radial direction of the ring gear 30. Alternatively, the weld areas W may extend in the direction crossing (inclined to) the rotation axis direction and the radial direction.

Further, in the first to third embodiments, the present disclosure is applied to the differential device 100 (150, 200, 250) of the front-wheel-drive (FF) vehicle 1. However, the present disclosure is not limited thereto. That is, the present disclosure may be applied to a differential device 100 of a rear-wheel-drive (RR (rear-engine, rear-wheel drive)) vehicle 1 in which an engine 2 and a transmission 3 are mounted in an engine room at the rear and the rear wheels are driven. If the ring gear 30 and the output gear 3a of the transmission 3 are helical gears that mesh with each other, the engine 2 (the crankshaft 2a) may be mounted in either of the transverse direction and the vertical direction.

Further, in the first to third embodiments, the differential device 100 is connected to the output gear 3a of the transmission 3 having a multiple-speed power transmission mechanism. However, the present disclosure is not limited thereto. The present disclosure may be applied to a differential device 100 connected to an output gear 3a of a continuously variable transmission (CVT) that continuously changes the speed ratio using a mechanism other than gears.

Further, in the first to third embodiments, the present disclosure is applied to the differential device 100 (150, 200, 250) of the vehicle 1 with the engine (internal combustion engine) 2 mounted thereon. However, the present disclosure is not limited thereto. The present disclosure may be applied to a differential device 100 of a hybrid automobile using both an engine 2 and an electric motor.

The invention claimed is:

1. A member joining structure for a differential device, the member joining structure comprising:
    a ring gear including a helical tooth extending in a rotation axis direction;
    a differential case that is rotated with the ring gear;
    a first support that is disposed in a first position at a back surface of the ring gear that radially overlaps one outermost end in the rotation axis direction of the helical tooth and that connects the differential case and the ring gear; and
    a second support that is disposed in a second position at the back surface of the ring gear at another end in the rotation axis direction of the helical tooth that is opposite the one outermost end and that connects the differential case and the ring gear, wherein:
        the first support and the second support are spaced apart from each other with a cavity therebetween,
        the cavity is delimited by the first support, the second support, the ring gear and the differential case, and an entire space of the cavity is an empty space,
        the differential case includes a gear accommodating portion inside the differential case and the first support and the second support are on an outer peripheral surface of the differential case,
        the first support directly supports the back surface of the ring gear at the one outermost end in the rotation axis direction of the helical tooth, and the second support directly supports the back surface of the ring gear at the another end opposite the one outermost end in the rotation direction of the helical tooth,
        each of the first position and the second position extends circumferentially around the rotation axis of the ring gear,
        the first support is formed integrally with the ring gear, and the second support is formed integrally with the differential case; and
        a first end of the first support on a differential case side and a portion of the differential case facing the first end are joined to each other, and a second end of the second support on a ring gear side and a portion of the ring gear facing the second end are joined to each other.

2. The member joining structure for a differential device according to claim 1, wherein a first joining position between the first end and the differential case and a second joining position between the second end and the ring gear are different from each other in a radial direction of the ring gear.

3. The member joining structure for a differential device according to claim 2, wherein the ring gear including the first support has an L-shape in a cross section along the rotation axis.

4. The member joining structure for a differential device according to claim 3, wherein the ring gear and the differential case are welded to each other at the first joining position and at the second joining position.

5. The member joining structure for a differential device according to claim 4, wherein weld areas between the ring gear and the differential case extend in the rotation axis direction of the ring gear.

6. A member joining structure for a differential device, the member joining structure comprising:
    a ring gear including a helical tooth extending in a rotation axis direction;
    a differential case that is rotated with the ring gear;
    a first support that is disposed in a first position at a back surface of the ring gear that radially overlaps one outermost end in the rotation axis direction of the helical tooth and that connects the differential case and the ring gear; and
    a second support that is disposed in a second position at the back surface of the ring gear at another end in the rotation axis direction of the helical tooth that is opposite the one outermost end and that connects the differential case and the ring gear, wherein:
        the first support and the second support are spaced apart from each other with a cavity therebetween,
        the cavity is delimited by the first support, the second support, the ring gear and the differential case, and an entire space of the cavity is an empty space,
        the differential case includes a gear accommodating portion inside the differential case and the first support and the second support are on an outer peripheral surface of the differential case,
        the first support directly supports the back surface of the ring gear at the one outermost end in the rotation axis direction of the helical tooth, and the second support directly supports the back surface of the ring gear at the another end opposite the one outermost end in the rotation direction of the helical tooth,
        each of the first position and the second position extends circumferentially around the rotation axis of the ring gear,
        the first support and the second support are formed integrally with one of the differential case and the ring gear; and
        ends of the first support and the second support on a side opposite to the one of the differential case and the ring gear and portions of the other of the ring gear and the differential case facing the ends are joined to each other.

7. The member joining structure for a differential device according to claim 6, wherein the ring gear and the differential case are welded to each other at a first joining position and at a second joining position.

8. The member joining structure for a differential device according to claim 7, wherein weld areas between the ring gear and the differential case extend in the rotation axis direction of the ring gear.

* * * * *